United States Patent [19]
Carleton

[11] 3,882,368

[45] May 6, 1975

[54] APPARATUS AND METHOD FOR AUTOMATIC OR MANUAL PROCESS CONTROL

[75] Inventor: James T. Carleton, Pittsburgh, Pa.

[73] Assignee: Westinghouse Electric Corporation, Pittsburgh, Pa.

[22] Filed: July 14, 1972

[21] Appl. No.: 271,857

[52] U.S. Cl................................ 318/610; 318/591
[51] Int. Cl. ............................................ G05b 11/42
[58] Field of Search..................... 318/591, 609, 610

[56] References Cited
UNITED STATES PATENTS
2,954,514  9/1960  Hemstreet.......................... 318/611

Primary Examiner—T. E. Lynch
Attorney, Agent, or Firm—E. F. Possessky

[57] ABSTRACT

Apparatus and a method for achieving bumpless transfer between the manual and automatic modes in either single or multiple loop process control systems. The last stage of the process controller is an integrator which generates the final control element position signal in both the manual and automatic modes. Proportional, first derivative or second derivative actions applied to the measured variable and/or the set point in the first stage of the controller become integral, proportional and derivative actions, respectively, after passing through the integrator. Since the integrator remains in the output circuit and is under control continuously in both modes, bumpless transfer between the manual and automatic modes is achieved without the necessity of matching signals. When two controllers are used in cascade, the speed signal generated by the first stage of the inner loop controller is applied to the integrator stage of the outer loop controller so that it tracks the measured variable of the inner loop while the inner loop is in the manual mode. Only integral action is applied to the set point inputs of the controllers so that the rate of change of the set point signal is not critical.

16 Claims, 5 Drawing Figures

3,882,368

APPARATUS AND METHOD FOR AUTOMATIC OR MANUAL PROCESS CONTROL

CROSS-REFERENCE TO RELATED APPLICATIONS

1. My application entitled "Compensation Apparatus and Method," Ser. No. 269,000, filed July 5, 1972 and, assigned to the same assignee as this application, now U.S. Pat. No. 3,786,492.

2. My application entitled "Digital Integration Apparatus and Method", Ser. No. 268,951, filed July 5, 1972 and, assigned to the same assignee as this application, now U.S. Pat. No. 3,786,491.

3. The commonly owned application of Henry Cook and James Sutherland entitled "Process Control Apparatus and Method for Generating An Uninterrupted Control Signal During Servicing of the Control Apparatus", Ser. No. 268,953, filed July 5, 1972, now U.S. Pat. No 3,769,552.

BACKGROUND OF THE INVENTION

1. Field of the Invention

This invention relates to process control systems and, more particularly, to apparatus and techniques for achieving bumpless transfer between the automatic and manual modes of operation in both single and multiple loop process control systems.

2. State of the Prior Art

In the classic process control system, a measured process variable is compared with a set point or desired value in a controller to generate an error signal. A control signal generated in the controller as a function of the error signal is applied to a final control element which regulates the flow of energy into or out of the process. Typically, a final control element may be a valve which controls the flow of a fluid to or from the process.

The four basic types of controllers are (1) the off-on, (2) the integral, (3) the proportional, and (4) the derivative. The off-on type, as the name implies, applies a full-on or full-off signal to the final control element in order to maintain the measured variable near the set point. Variations on the off-on controller include partial control of the input and additional final control elements in parallel which operate at different levels of the error signal.

The proportional controller generates a control signal which is directly proportional to the magnitude of the error signal. The control signal may be either a continuous or stepwise function of the error signal. The stepwise control signal operates the single final control element to a number of intermediate operating points and should not be confused with the stepwise operation of the off-on controller where each final control element is operated either full-on or full-off with the individual final control elements effected at the different levels of the error signal. In both the off-on and the proportional controller, the control signal applied to the final control element is zero when the error signal is zero. This produces a droop or offset effect when the load is changed. In other words, the measured variable will seek a new level even though the set point has not been changed. Some proportional controllers include a manual reset feature for compensating for load changes, but such a feature is impractical where load changes occur frequently.

The integral controller generates a control signal which is the integral of the error signal. Thus, the rate of change of the control signal is directly proportional to the magnitude of the error signal and the control signal is equal to the area under the time-error signal curve. Since the integral action controller generates a signal which is a function of the history of the error signal, it maintains a new level after the error returns to zero following a disturbance. This gives the integral controller the capability of eliminating the droop or off-set caused by load changes, and for this reason integral control is often referred to as automatic reset control. The not yet fully appreciated advantage of integral control, in addition to the automatic reset feature, is that abrupt changes in the set point are applied gradually to the process through the integral action. In other words, the control signal lags the set point change. However, this inherent lag in response renders integral action alone unsuitable for processes involving large and rapid load changes.

The derivative controller generates a control signal which is the derivative of the error signal. This means that the control signal is directly proportional to the rate of change of the error signal. It is clear then that the control signal generated by this type of controller is equal to zero except when the error is changing, and thus will remain equal to zero in the presence of a constant error signal. The derivative mode generates a control signal which leads the error signal and, for this reason, is useful in initiating a change in operating conditions in systems having prolonged time constants.

To this point the discussion has been directed to the control action effected by each of the four basic modes of control used alone. In practice, two or more modes of control may be combined to provide the desired control for a particular process. In considering which modes to use, the inherent lag in the process, the final control element and the measuring equipment, in addition to the load changes and the magnitude and frequency of set point changes that the system will be subject to, must be taken into account. The integral mode of control is often used with the proportional mode to combine the automatic reset feature of the integral mode with the faster response of the proportional mode. This provides satisfactory control for most processes including those with large load changes as long as the changes are slow and the lags in the system are not excessive. Sometimes the derivative mode is combined with the proportional mode to improve the response of systems having large lag. The combination of the proportional, integral and derivative modes is now widely used to provide a control system which is efficient under almost any condition. The relative contributions of the various control actions must be considered in adapting a three-mode controller to a particular process in such a manner as to optimize the response time and the stability of the system.

In all of the above controllers, the control action or actions are applied to the error signal and is thus referred to as error control. In some three-mode controllers, the derivative action is only applied to the measured variable so that the speed of set point adjustment is not as critical, yet the system responds quickly to load changes through the derivative action applied to the measured variable. However, since proportional control is still applied to the set point signal, the operator must still be careful in adjusting the set point to avoid large changes in the control signal.

In a newer type of control system, the set point is applied directly to the final control element with only a proportional action to force a rapid change in the process, especially where there are large lags in the system. The new operating point of the final control element is then trimmed by the error signal to which integral, and in some instances derivative action, is applied. In this type of control, which is referred to as feed-forward control, care must also be taken in adjusting the set point to avoid the application of excessive control signal excursions to the final control element.

When the above control systems are operating in response to the measured variable feedback signal, they are said to be operating in the automatic mode. Most controllers can also be operated in a manual mode wherein they generate a manually adjustable control signal independent of the actual response of the system. The manual mode is often used in starting up the process, during step changes in batch processes, or when it is desired to maintain process control while removing portions of the control system for servicing. During open-loop manual operation, the proportional, integral and derivative actions are not applied to the control signal. However, as the measured variable responds to the manual control signal, the resultant error signal causes the integrator to wind up in storing the accumulated error. If this continues unchecked, the integrator will saturate. If the system is then switched from manual to automatic, this accumulated error will cause a large "bump" in the control signal.

In order to reduce this objectionable bump upon transfer from the manual to automatic modes of operation, it is common to provide additional circuitry to cause the output of the integrator section to attempt to track the manual signal. In addition to the requirement for additional circuitry, this scheme is not completely successful in eliminating the bump. This is a consequence of fact that the output stage of the prior art controllers, through which the transfer from manual to automatic operation is made, is an amplifier stage. While in manual control, the amplifier is shunted by a capacitor to form an integrator which generates the manual control signal as a function of the integral of manually controlled increase and decrease signals applied to the integrator input. When the controller is switched from manual to automatic, the capacitor is removed from the circuit and the error signal, to which the various control actions have been applied, is connected to the output amplifier. Although the additional circuitry may fairly accurately match this signal with a manual signal, there is still somewhat of a bump upon transfer.

One manufacturer has attempted to reduce the bump and eliminate the need for additional external circuitry in effecting the transfer from manual to automatic operation by switching the integrating capacitor from the feedback loop to the output circuit of the amplifier. Since the capacitor is charged to the manual signal level, a large bump is not applied to the final control element. However, any switching such as this in the output circuit will apply a bump of some magnitude to the final control element. This scheme also requires additional switching to initialize the integral action portion of the automatic controller. Furthermore, the additional lag created by the capacitor in the output circuit during automatic operation may be objectionable in certain applications.

In some applications, two or more controllers may be connected in cascade. Difficulties are encountered in transferring such multiple loop control systems from manual to automatic operation since the integrator in each controller must be controlled to prevent wind-up. In the past, a great deal of manual "jockeying" by the operator was required to effect the transfer which, at best, was anything but bumpless.

SUMMARY OF THE INVENTION

According to the invention, a process controller is divided into two parts or stages, with the second or output stage comprising an integrator which generates the final control element position signal in both the manual and automatic modes. In the manual or director mode, the control signal is generated as the integral of manually produced raise or lower signals applied to the input of the integrator. In the automatic or regulator mode, a final control element desired speed signal is generated in the first part or stage of the controller as a function of a set point and a measured variable feedback signal. This desired speed signal is converted to the final control element desired position signal by the integrator in the second stage of the controller.

Since in accordance with the concepts of the invention the integrator is utilized and remains under control in both the automatic and manual modes, the problem of integrator wind-up encountered in the prior art controllers while operating in the manual mode is eliminated. Furthermore, since the switching of signals between the automatic and manual modes is accomplished on the input side of the output integrator, there is no need to match signals. On transferring from automatic to manual, the integrator maintains a constant output at the level last called for by the speed signal until a manual raise or lower signal is applied to the input. On the other hand, if a speed signal is being generated by the first stage of the controller at the time that the transfer from manual to automatic is made, the integrator will merely ramp to the new output without introducing any discontinuities in the control signal applied to the final control element. The system will then seek the level commanded by the set point signal at a controlled rate. This completely eliminates the necessity for additional circuitry for effecting transfers between the manual and automatic modes and requires only one switching operation.

Another feature of the invention contemplates that only integral action be applied to the set point signal. Heretofore, integral action has been applied mainly to achieve the automatic reset feature in combination with proportional action. However, the lag introduced by integral action alone when applied to the set point signal results in a very smooth transition to the new control point. Unlike the prior art systems wherein proportional control was also or solely applied to the set point signal, the operator is not compelled to slowly crank in the change to avoid introducing large perturbations in the system.

In the two-stage controller contemplated by the invention, proportional action applied to a signal in the first stage becomes integral action after the second stage. Similarly, first derivative and second derivative actions applied to a signal in the first stage become proportional and derivative actions, respectively, after the integration of the second stage. Preferably, the measured variable signal is summed in opposition to the set point signal to generate an error signal to which proportional gain is applied. The proportional error signal is then summed with the first derivative, and if desired, the second derivative, of the measured variable to generate the desired speed signal. After integration in the second stage, the resulting position control signal is a function of a set point signal to which only integral action has been applied and a measured variable signal to which integral, proportional and derivative actions have been applied. Alternatively, the first stage of the controller may be arranged to apply any combination of control actions to the set point signal and the measured variable signal.

When two controllers are used in cascade, the speed signal generated by the inner loop controller may be applied to the integrator of the outer loop controller while the inner controller is operated in the manual mode. Since the output of the outer loop controller serves as the set point for the inner loop, the integrator of the outer loop controller will remain under control as it tracks the measured variable of the inner loop. Since the speed signal generated by the first stage of the inner loop controller will, therefore, be equal to zero, no immediate change in the control signal will occur when the inner loop is switched to automatic. When the outer loop is switched to automatic, the integrator in the outer loop controller will ramp towards a new value determined by the applied set point signal and the inner loop will smoothly adjust to the new conditions. Additional loops could be transferred to automatic control in a similar manner.

Preferably, a digital integrator is utilized in the output stage of the controller to eliminate the problems of drift associated with the prior art analog integrators. The analog speed signal is converted to a pulse signal by a voltage controlled clock which generates pulses at a rate proportional to the magnitude of the applied signal. A count of these pulses is accumulated in a reversible digital counter. The accumulated count is transformed into the analog control signal by a digital-to-analog converter. In the manual mode, the raise and lower signals activate a director clock to generate pulses which are applied to the reversible counter. Preferably, the director clock is also a voltage controlled clock and is responsive to an integrator which generates an applied signal which increases in magnitude with time so that the manual control signal will change at a more rapid rate if the raise or lower button is held down. In addition, upper and lower limits may be placed on the reversible counter to maintain the control signal within a predetermined range. Ideally, these limts are adjustable.

The invention also embraces the method of process control wherein only integral action is applied to the set point signal while a combination of control actions is applied to the measured variable signal. It further includes the method of generating either automatic or manual final control element speed signals and integrating the selected signal to generate the final control element position signal. As applied to multiple loop systems, the method includes the generation of the set point signal for the inner loop by integrating either (1) an automatic signal generated as a function of a second set point signal and a second measured process varible signal when the inner loop is on automatic control, or signal when the inner loop is on automatic control, or (2) the automatic speed signal generated in the inner loop when the final element position signal is being generated as a function of the manual final control element speed signal.

BRIEF DESCRIPTION OF THE DRAWINGS

An understanding of the invention can be gained from a reading of the following description, taken in conjunction with the accompanying drawings, in which:

Referring to FIG. 1, a process controller identified by the general reference character 10 is divided into a first part or stage 12 and a second part or stage 14. The first stage 12 is provided with a set point signal input 16 and a measured variable signal input 18. The measured variable signal is a feedback signal from the process being controlled, and is proportional to a selected process variable. The set point signal is proportional to the desired value of the measured variable. The set point signal and measured variable signal are applied to input buffers 20 and 22, respectively, which convert the applied differential signals to single-ended signals. The input buffer 20 may additionally convert a unipolar set point to a bipolar signal.

Figure 1:
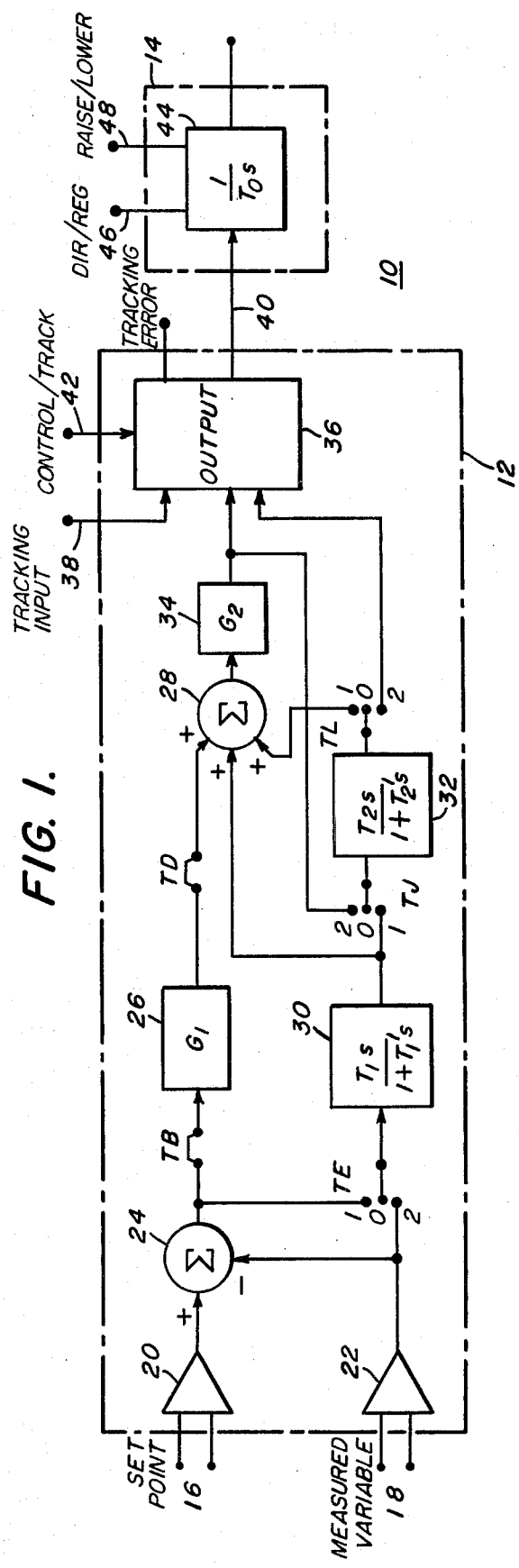
FIG. 1 is a schematic diagram in block form of a process controller embodying the invention.

The measured variable signal is summed in opposition to the set point signal in the summing amplifier 24 to generate an error signal. The error signal is applied through the switch TB to a variable gain stage 26. The variable gain stage may comprise an operational amplifier shunted by variable feedback resistance, as is well known in the art. As will be seen later, the gain $G_1$ of the variable gain stage 26 determines the amount of integral action applied to the error signal.

The output of the variable gain stage 26 is applied to one of the inputs of summing amplifier 28 through the switch TD. Another input to the summing amplifier 28 is the output of the range control 30. The range control 30 is a differentiator which generates a signal which is substantially a derivative function of the error signal if switch TE is in position 1, or of the measured variable signal only, if the switch TB is in position 2. Preferably, the differentiator 30 is similar to that disclosed in my application reference 1 above. Such a differentiator comprises an integrator connected in the feedback loop of an operational amplifier. The advantage of this type of differentiator is that it minimized distortion caused by saturation of its output signal. The differentiator will continue to generate the maximum output signal even though the applied signal has become constant until the integrator in the feedback loop has generated a feedback signal equal to the applied signal. Although reference 1 discloses a digital integrator, an analog integrator comprising a capacitor in the feedback loop of an operational amplifier can be utilizied in the differentiator. As will be seen, the range control 30 is instrumental in determining the amount of proportional action applied either to the error signal or measured variable through adjustment of the time constant of the differentiator.

The output of the range control 30 may be applied to a second differentiator 32 by actuating switch TJ to position 1. The differentiator 32 may be similar to the differentiator in the range control 30. The output of the differentiator 32, which is the second derivative of either the error signal or the measured variable signal is applied to the summing amplifier 28 by actuating switch TL to position 1. As will also be discussed hereinafter, the differentiator 32 determines the amount of derivative action which is applied either to the error signal or the measured variable signal by the controller.

The output of the summing amplifier 28 is applied to another variable gain stage 34. The output of the variable gain stage 34 is applied to the controller first stage output 36. In an alternate configuration, the derivative action circuit 32 may be connected in parallel with the output of variable gain stage 34 by actuating the switch TL is in position 2.

The first stage output 36 applies either the signal generated by the first stage of the controller or a tracking signal applied on the tracking input 38 to the first stage output lead 40 under the command of a CONTROL/TRACK signal applied to input 42.

The selected signal on lead 40 is applied to the integrator 44 in the second stage of the controller. The integrator 44 may be operated in either an automatic or manual mode, which will be referred to as the regulator or director modes for reasons to be discussed later, in response to a DIRECTOR/REGULATOR signal applied through input 46. While in the director mode of operation, the output of the integrator 44 may be increased or decreased in response to RAISE or LOWER signals applied to the input 48.

Figure 2:
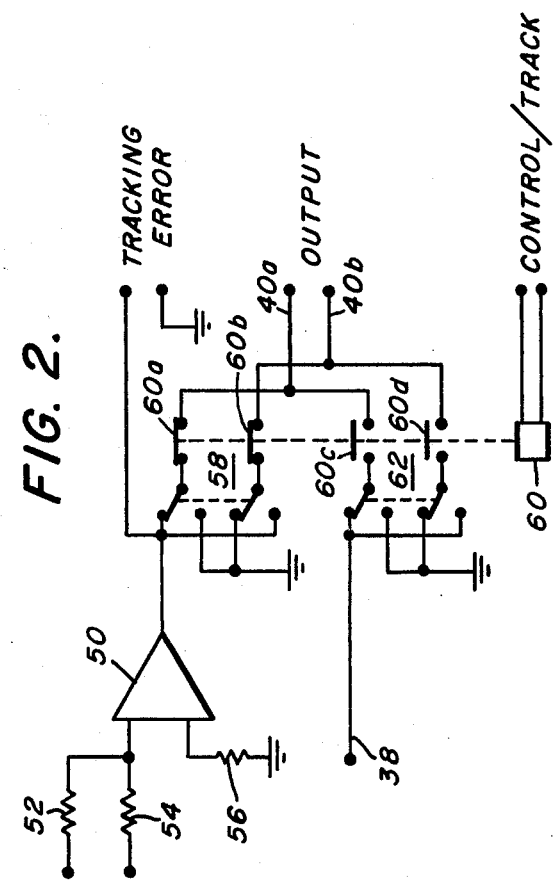
FIG. 2 is a schematic circuit diagram of a portion of the process controller illustrated in FIG. 1.

FIG. 2 illustrates the circuit of the first stage output. The output of the variable gain stage 34 and the differentiator 32 when the switch TL is in position 2 are applied to the summing junction of an operational amplifier 50 through input resistors 52 and 54, respectively. The other input to the operational amplifier, which acts as an output buffer, is connected to ground through resistor 56. The output of the amplifier 50 is applied to a tracking error output, and through the reversing switch 58 and the normally closed contacts 60a or 60b of the CONTROL/TRACK relay 60, to the first stage output leads 40a or 40b. The purpose of the reversing switch will become evident during the later discussion.

The first stage output also provides for applying a tracking signal applied through input 38 to the output leads 40a or 40b through reversing switch 62 and the normally open contacts 60c or 60d of the CONTROL/TRACK relay 60. With the relay 60 de-energized, the signal generated by the first stage of the controller is applied to the output leads 40a and 40b. However, when the CONTROL/TRACK relay is energized from a remote station, the contacts 60a and 60b open to disconnect the output of the amplifier 50 from the output circuit and the contacts 60c and 60d close to apply the tracking signal to the leads 40a and 40b.

Figure 3:
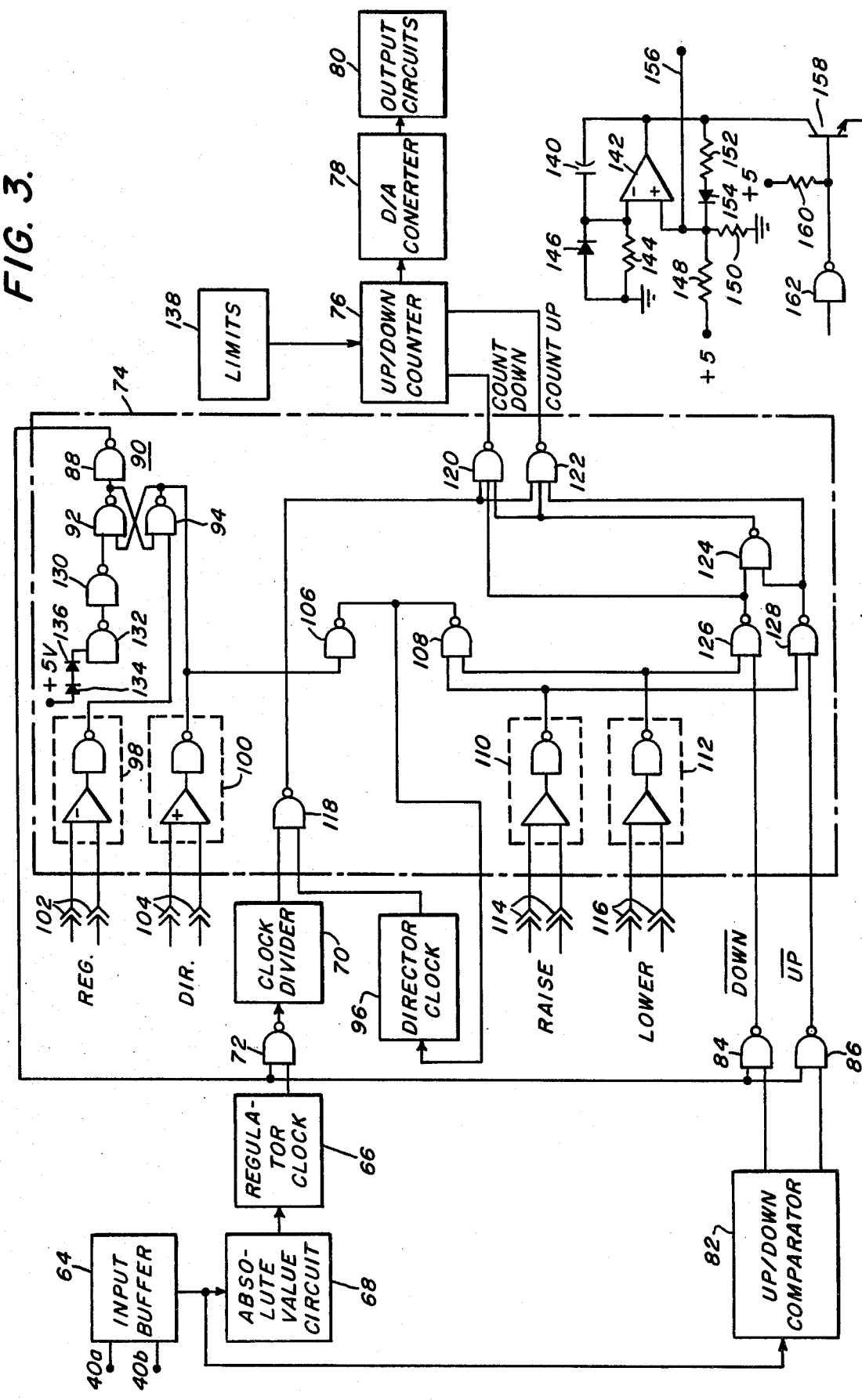
FIG. 3 is a more detailed schematic diagram in block diagram form of a portion of the controller illustrated in FIG. 1.

Turning to FIG. 3, it can be seen that the signal appearing on the leads 40a and 40b is applied to the input buffer 64 of the integrator 44 in the output stage of the controller. Preferably, the integrator is a digital integrator of the type disclosed in my application reference 2 above, with modifications to be specifically noted. The analog signal from the first stage of the controller is converted into a pulse signal by the regulator clock 66. The regulator clock may be identical to the voltage-to-frequency converter utilized in reference 2 which generates pulse signals having a frequency which is directly proportional to the magnitude of an applied signal. Since this voltage-to-frequency converter is only responsive to positive input signals, an absolute value circuit 68 similar to that employed in reference 2 is interposed between the input buffer 64 and the regulator clock 66.

The pulses generated by the regulator clock 66 are applied to a clock divider 70 through NAND gate 72. The NAND gate is a well-known logic element which generates a ZERO signal at its output if all the inputs are digital ONEs; otherwise, its output is a digital ONE. The clock divider 70 is similar to the count divider and its associated gating circuitry described in the reference 2. The clock divider 70 is effective to divide down the pulses generated by the regulator clock by a factor which is selectable over an extended range. The divided down pulses are applied through the logic circuitry 74, to be described shortly, to the up/down counter 76. The accumulated count in the counter 76 is converted to an analog signal by the digital-to-analog converter 78. This analog signal is converted to both a voltage and current output signal in block 80.

The rate at which the pulses accumulate in the up/down counter 76 for a given input signal determines the time constant of the integrator. Therefore, the setting of the clock divider 70 may be used to adjust the integrator time constant. In the exemplary circuit, the time constant may be varied between 2 seconds and 1,000 seconds.

The output of the input buffer stage 64 is also applied to the up-down comparator 82. It is similar to the up/down comparator described in reference 2 and is essentially a high gain amplifier which generates saturating positive or negative signals in accordance with the polarity of the input signal. These saturating signals, when applied to NAND logic circuits, generate up and down signals. The down signal is applied to one input of NAND gate 84 which produces the complementary $\overline{DOWN}$ signal. Similarly, the up signal from the up/down comparator is applied to one input of gate 86 which generates the complemenatry $\overline{UP}$ signal. The other input to the NAND gates 84 and 86 and to the NAND gate 72 is the output of the NAND 88 connected to the upper output of the regulator/director flip-flop 90 in the logic circuit.

The flip-flop 90 is made up of NAND elements 92 and 94 and is operative to transfer the integrator between the director and regulator modes of operation. In the regulator mode, the pulses generated by the regulator clock 66 are applied to the up/down counter 76, while in the director mode, the clock pulses are derived from the manually controlled director clock 96. The director/regulator flip-flop 90 is controlled by a REGULATOR signal applied through the line receiver 98 to the NAND element 94 and a DIRECTOR signal applied through the line receiver 100 to the output of NAND element 94 and the input of NAND element 92. A suitable line receiver is Type 9622, manufactured by Fairchild Semiconductor, Inc. of Mountainview, Calif. These devices will generate a ZERO output signal when the applied signal exceeds a predetermined threshold and, otherwise, they will generate a digital ONE signal.

The REGULATOR and DIRECTOR signals are generated from a remote station and are applied to the controller through connectors 102 and 104, respectively. When the DIRECTOR signal is generated by the operator from the remote station, the output of line receiver 100 will go to ZERO to force the output of NAND element 92 to a ONE. This output remains equal to ONE even though the DIRECTOR signal is discontinued. With the output of the flip-flop equal to ONE, the output of NAND element 88 goes to ZERO to disable the NAND gates 72, 84 and 86. When a REGULATOR signal is applied to the line receiver 98, the ZERO signal applied to the NAND element 94 causes its output to go to ONE, thereby causing the output of the flip-flop 90 to go to ZERO. Thus, in the regulator mode the gates 72, 84 and 86 are enabled by the NAND element 88. By connecting the output of line receiver 100 to the output of NAND element 94, the DIRECTOR signal dominates so that, if both a DIRECTOR signal and a REGULATOR signal are generated simultaneously, the integrator will be transferred to the director mode.

Although the output of line receiver 100 goes to ONE when the operator releases the director button, the output of the NAND 94 will be pulled down to ZERO by the ONE input from the line receiver 98 and the flip-flop output. Thus, with the flip-flop 90 in the director mode, the output of NAND element 106 will be equal to ONE. The output of this NAND element is connected to the enable input of the director clock 96 and to the output of another NAND element 108. The outputs of both of these NAND elements must be equal to ONE in order to apply an enabling signal to the director clock. If the output of either NAND element 106 or 108 is equal to ZERO, the enable signal will be pulled down to ZERO. A momentary RAISE signal is applied to the NAND element 108 through line receiver 110. Similarly, a momentary LOWER signal is applied to the NAND element 108 through line receiver 112. When no RAISE or LOWER signals are being generated, the output of line receivers 110 and 112 will be equal to ONE to disable the director clock. The RAISE and LOWER signals are also generated by the operator at the remote station and applied to the controller through connectors 114 and 116, respectively.

When the operator depresses the RAISE button, the output of line receiver 110 will go to ZERO to force the output of NAND element 108 to go to ONE. If the integrator is in the director mode so that the output of NAND element 106 is equal to ONE, the director clock 96 will be enabled as long as the RAISE signal is applied. Similarly, the director clock will be enabled as long as a LOWER signal is applied while the integrator is in the director mode. The pulses generated by the director clock 96 are applied along with the pulses from the clock divider 70 to NAND gate 118. The output of NAND element 118 is applied to both NAND elements 120 and 122. Additional inputs to the NAND element 120 include the output of NAND elements 124 and 126. NAND element 124 also provides an additional input to NAND element 122 along with NAND element 128. The NAND elements 126 and 128 provide the inputs for the NAND element 124. The NAND element 126 is gated by the $\overline{DOWN}$ signal and the LOWER signal from line receiver 112. Similarly, the NAND element 128 is gated by the $\overline{UP}$ signal and the RAISE signal from line receiver 110.

The director/regulator flip-flop 90 is forced to the director mode as power is applied during start-up through the serially connected NAND elements 130 and 132 connected to the input of the NAND 92. The 5-volt supply voltage is applied to the NAND element 132 through serially connected diodes 134 and 136. This master clear circuit operates on the fact that, if no signal is applied to the NAND element, the output goes to ZERO. Due to the diodes in the supply line to the NAND element 132, the NAND element 130 will reach operating voltage before the NAND element 132. Since at this instant no signal is applied to the input of the NAND element 130, its output goes to ZERO to force the output of the flip-flot to ONE. When the NAND element 132 reaches its operating potential, its output goes to a digital ZERO to cause the output of NAND element 130 to go to ONE. After initial start-up, then, the NAND element 92 is under control of the DIRECTOR signal.

In many applications it is desirable to place upper and lower limits on the output signal. For instance, in some process control systems, it may be desirable to maintain a minimum flow or to limit the maximum flow to some predetermined level below the maximum capability of the final control element. To this end, limiters 138 prevent the up/down counter 76 from counting down below a predetermined limit or above an upper limit. Such limit means for counters are well known in the art. The limits may be fixed or adjustable. If desired for ease in setting the limits, binary coded decimal counters and limiters can be utilized, as is also well known in the art. With such equipment the limits can easily be set to predetermined percentages of the counter capacity. In this case the digital-to-analog converter must also be a binary coded decimal converter.

The integrator operates as follows. When power is applied, the master clear circuit forces the regulator/director flip-flop 90 to the director mode. The master clear signal may also be used to force the up/down counter to ZERO or to the lower limit through means not shown. With the output of the flip-flop 90 equal to ONE, the gates 72, 84 and 86 are disabled through the NAND element 88. Therefore, the pulses generated by the regulator clock 66 in response to the signal applied to the input buffer 64 will have no effect and the $\overline{DOWN}$ and $\overline{UP}$ signals will both be equal to ONE. At this point the output of the line receivers 110 and 112 will both be equal to ONE to generate ZERO signals at the outputs of NAND elements 108, 126 and 128 to disable the director clock 96 and the gates 120 and 122 connected to the count-down and count-up inputs, respectively, of the up/down counter 76. If the operator now applied a RAISE signal to line receiver 110 to cause its output to go to ZERO, the output of NAND 128 will go to ONE to enable the gate 22. With the output of NAND 106 held equal to ONE by the regulator/director flip-flop 90, the director clock 96 will begin to generate clock pulses when the output of NAND 108 goes to ONE in response to the RAISE signal. The clock pulses generated by the director clock 96 will be applied through the NAND element 118 to the NAND element 122 which will, in turn, apply the pulses to the count-up input of the up/down counter 76. The pulses from the director clock will be applied to the count-up input of the up/down counter as long as the operator continues to apply the RAISE signal to the integrator. When the RAISE signal is discontinued, the output of NAND 108 will go to ZERO to disable the director clock and the output of NAND 128 will go to ZERO to disable the NAND 122.

Should the operator desire to lower the output signal, he applies a LOWER signal to the line receiver 112 which enables the director clock and applies the pulses generated to the count-down input of the up/down counter through gate 120 enabled by gate 126. Should the operator apply both a RAISE and LOWER signal simultaneously, the outputs of NANDs 126 and 128 will both go to ONE to disable the gates 120 and 122 through NAND 124.

To transfer the integrator to the regulator mode, the operator applies a REGULATOR signal to the line receiver 98 to cause the director/regulator flip-flop 90 to go to ZERO. This causes the output of NAND 94 to go to ONE which, in turn, forces the output of NAND 106 to go to ZERO to disable the director clock despite the application of a RAISE or LOWER signal. The ZERO at the output of flip-flop 90 enables the gates 72, 84 and 86 through the NAND 88. If the signal applied to the input buffer 64 of the integrator is positive, the up/down comparator 82 will apply a ONE to the other input of NAND 86 to cause the up signal to go to ZERO. With the UP signal equal to ZERO the output of NAND 128 will go to ONE to enable the gate 122. The pulses generated by the regulator clock 66 as a function of the magnitude of the signal applied to the input buffer will be applied through the gate 72 to the clock divider 70. The regulator clock pulses divided down by the selected rate will then be applied through gates 118 and 122 to the count-up input of the up-down counter 76. These pulses will continue to be applied to the up input of the counter as long as the applied signal remains positive or until the up/down counter 76 reaches its upper limit. If the input signal goes negative, the up/down comparator 82 will cause the UP signal to go to ONE to disable the gate 122 and will cause the DOWN signal to go to ZERO to enable the gate 120. The regulator clock pulses divided down at the selected rate will then be applied to the count-down input of the up/down counters as long as the input signal remains negative, or until the lower limit of the counter is reached. It can be seen that the signals are interlocked so that manual signals may not be applied to the counter when the integrator is in the regulator mode and, conversely, the regulator clock pulses cannot be applied to the counter in the director mode. Furthermore, the polarity of the signal applied to the input buffer cannot effect the direction of count of the up/down counter while in the director mode and application of both a RAISE and LOWER signal while in the director mode has no effect.

The described controller is readily implemented by printed circuit techniques. Many of the components such as the up/down counter, the digital-to-analog converter, and the major components of the clock divider are available in integrated circuit packages, which greatly reduces the space required for the controller. In practice, the first stage 12 of the controller has been mounted on one printed circuit board referred to as the control card and the second stage 14 has been mounted on a second printed circuit board referred to as the driver card. Both cards are controlled from a remote station. This compact arrangement permits the many controllers required in a large process control system to be mounted in a single cabinet. By mounting the first and second stages of the controller on separate printed circuit cards, portions of the controller can be removed for servicing while maintaining a continuous control signal, as fully described in reference 3 above.

Figure 4:
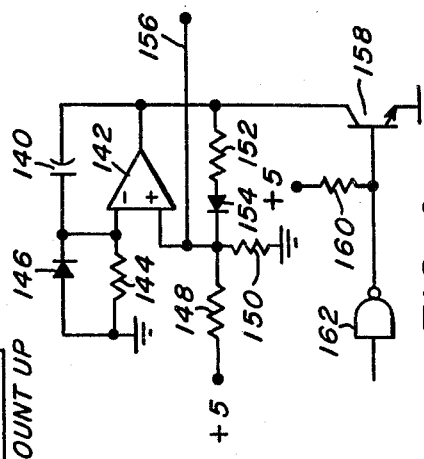
FIG. 4 is a schematic circuit diagram of a portion of FIG. 3.

In order to provide a variable slewing rate for the director mode, the circuit of FIG. 4 may be connected to the input of the voltage-to-frequency converter of the director clock 96. This circuit includes a capacitor 140 connected between the output and the inverting input of operational amplifier 142. The inverting input of the amplifier is also connected through resistor 144 to ground. The resistor 144 is shunted by diode 146. The non-inverting input of the amplifier is connected to a voltage divider comprising the resistors 148 and 150 connected between the +5 volt supply and ground. Positive feedback to the non-inverting input of the amplifier is provided through resistor 152 and diode 154. The output of the circuit is taken from the non-inverting input of the amplifier 142 on lead 156. The collector-to-emitter circuit of pnp transistor 158 is connected between the output of the amplifier 142 and ground. The base of transistor 158 is connected through resistor 160 to the +5 volt supply and to the output of NAND 162. The director clock enable signal is applied to the input of the NAND 162.

The circuit of FIG. 4 operates as follows. When the director clock enable signal is equal to ZERO, the output of NAND 162 is ONE to turn on transistor 158. Additional base drive current for the transistor 158 is provided by the +5 volt supply through the resistor 160 to prevent the output of NAND 162 from being pulled down. With transistor 158 switched on, the output of the amplifier 142 is held at virtual ground potential and the signal appearing on lead 156 is a very low initializing potential determined by the voltage divider.

When the director clock enable signal goes to ONE, the output of NAND 162 goes to ZERO to switch the transistor 158 off, thereby unclamping the output of amplifier 142. The output of amplifier 142 will then begin to rise as the capacitor 140 charges through resistor 144 in response to the signal applied to the non-inverting input by the voltage divider. If the operator continues to apply the RAISE or LOWER signal, the output of amplifier 142 will slowly reach the point where it will exceed the potential on the non-inverting input by an amount equal to the forward drop of diode 154. From this point on, positive feedback will be applied to the non-inverting input through the resistor 152, and both the output of the amplifier and the potential on the non-inverting input will increase at a rate proportional to the square of the time that the enable signal is applied. This will continue until the amplifier 142 saturates, which, in the exemplary embodiment of the invention, requires approximately ten seconds. Thus, it can be seen that the signal appearing on the lead 156, which is applied to the voltage controlled clock, increases slowly at first and then at a rate proportional to the square of the time that the enabling signal is applied. Thus, the controller integrator may be made to slew at a rapid rate if a large change in the output signal is desired. As the output reaches the desired level and the RAISE or LOWER signal is discontinued, the transistor 158 will be switched on and capacitor 140 will be rapidly discharged through the diode 146 and the transistor. Thus, the circuit is rapidly reset for slewing each time the enable signal is discontinued.

CONTROLLER OPERATION

The operation of the controller illustrated in block diagram form in FIG. 1 can best be understood by considering the Laplace transfer functions of the various configurations of the controller. Laplace transforms are convenient mathematical tools for solving linear differential equations describing the operation of a physical system or process. They are integral transforms which convert differential equations with time as the independent variable into algebraic equations which, when solved, can be transformed back into the time domain to yield the solution to the differential equation.

The Laplace transform of an integrator, such as the integrator represented by the block 44, is well known to be $1/Ts$ where $T$ is the time constant of the integrator. The Laplace transform of an ideal differentiator is $Ts$; however, it is well known that the Laplace transform of the commonly used electrical differentiators is $Ts/1 + T's$. The $T's$ term represents the filtering effect of the physical circuits effective mainly at the higher frequencies. The Laplace transform of the variable gain stage is the gain $G$.

Since the differential equations describing the performance of the controller under consideration are linear, the effects of the integral, proportional and derivative actions will be considered separately and then summed to illustrate the overall effect of the controller. In these considerations, the set point signal will be represented by the symbol $u$, the measured variable signal by the symbol $v$, and the controller output signal by the symbol $E$ with the appropriate subscript.

The effect of the integral action which operates upon the error signal is represented by the following equation:

$$E_I = (u-v)G_1 G_2 \cdot \frac{1}{T_0 s} = (u-v) \frac{G_1 G_2}{T_0} \cdot \frac{1}{s} \quad \text{Eq.(1)}$$

In this equation $u-v$ represents the error signal. $G_1$ and $G_2$ represent the gains of variable gain stages 26 and 34 respectively, and $1/T_0 s$ represents the transform of the integrator 44. In a similar manner, the effect of proportional control upon the error signal (switch TE in position 1) through range control 30, variable gain stage 34 and the output integrator 44 is represented by the following equation:

$$E_P = (u-v)G_2 \cdot \frac{T_1 s}{1+T_1's} \cdot \frac{1}{T_0 s} = (u-v)G_2 \cdot \frac{T_1}{T_0} \cdot \frac{1}{1+T_1's} \quad \text{Eq.(2)}$$

The derivative action applied to the error signal through the range control 30, the derivative control 32, the variable gain stage 34 and the output integrator 34 with switches TE, TJ and TL all in position 1, is represented by the equation:

$$E_D = (u-v)G_2 \cdot \frac{T_1 s}{1+T_1's} \cdot \frac{T_2 s}{1+T_2's} \cdot \frac{1}{T_0 s}$$
$$= (u-v)G_2 \cdot \frac{T_1}{T_0} \cdot \frac{T_2 s}{(1+T_1's)(1+T_2's)} \quad \text{Eq.(3)}$$

If equations 1, 2 and 3 are added together and rearranged, the total effect of the controller on the error signal is represented by the following equation:

$$E_U = (u-v)G_2 T_1 s \left[ \frac{1}{(T_1/G_1)s} + \frac{1}{1+T_1's} + \frac{T_2 s}{(1+T_1's)(1+T_2's)} \right] \left[ \frac{1}{T_0 s} \right] \quad \text{Eq.(4)}$$

Ignoring the transfer function of the integrator which appears in the second bracket of Equation 4 for the moment, this equation represents the transfer function of the speed signal generated by the first stage of the controller. After passing through the integrator, the operator $s$ in the denominator of the second bracketed term is cancelled out by the operator $s$ in the numerator so that Equation 4 represents the final control element position signal.

The first term in the first bracket of Equation 4 represents the integral action, and as can be seen, the amount of integral action is determined by the ratio of the time constant $T_1$ of the range control to the gain $G_1$ of the variable gain stage 26. The second term in the first bracket represents the proportional action. The amount of proportional action is determined by the gain $G_2$ of the variable gain stage 34 and the ratio of the range control time constant $T_1$ and the integrator time constant $T_0$. The third term in the first bracket represents the derivative action and, as can be seen, the amount of derivative action is determined by the time constant $T_2$ of the derivative control 32. Therefore, the variable gain stage 34 is the primary control for proportional action, the variable gain stage 26 is the primary control for the integral action and the derivative control 32 is the primary control for the derivative action.

If the derivative control is transferred to the alternate position by actuating switches TJ and TL to position 2, the effect is to modify the proportional and integral action with a lead-lag function in accordance with the following equation:

$$E_O = (u-v)G_2 T_1 s \left[ \frac{1}{(T_1/G_1)s} + \frac{1}{1+T_1's} \right] \left[ \frac{1+(T_2+T_2')s}{1+T_2's} \right] \left[ \frac{1}{T_0 s} \right] \quad \text{Eq.(5)}$$

This configuration is useful in conteracting a large identified lag in a process by selecting the lead term in the numerator of the lead-lag function, represented by the second bracketed term in Eq. (5), to approximate this lag. The large lag is then replaced by the small lag represented by the denominator of the lead-lag function. In this respect, it is common practice in the control field to select $T_2'$ to be approximately 1/10 of $T_2$.

To this point, it has been assumed that the switch TE was in position 1 so that all the control actions have been applied to the error signal to simplify the equations. In practice, however, it is preferable that the switch TE be activated to position 2 and that switches TJ and TL be actuated to position 1 so that only integral action is applied to the error signal and therefore to the set point signal. The effect of proportional and derivative action on the measured variable alone, can be determined by replacing the term $(u-v)$ in Eqs. (2) and (3), respectively, with $v$. The total effect of the control on the set point signal and the measured variable signal is then determined by the following equation:

$$E_0 = G_2 T_1 s \left[ \frac{(u-v)}{(T_1/G_1)s} + v \right] \left[ \frac{1}{1+T_1's} + \frac{T_2}{(1+T_1's)(1+T_2's)} \right] \left[ \frac{1}{T_0 s} \right] \quad \text{Eq.(6)}$$

Other combinations of control actions can be applied to the set point signal, the measured variable signal or the error signal as desired. The equations for such combinations may be written in terms of the operators in a manner similar to that discussed above.

MULTIPLE LOOP CONTROL

Figure 5:
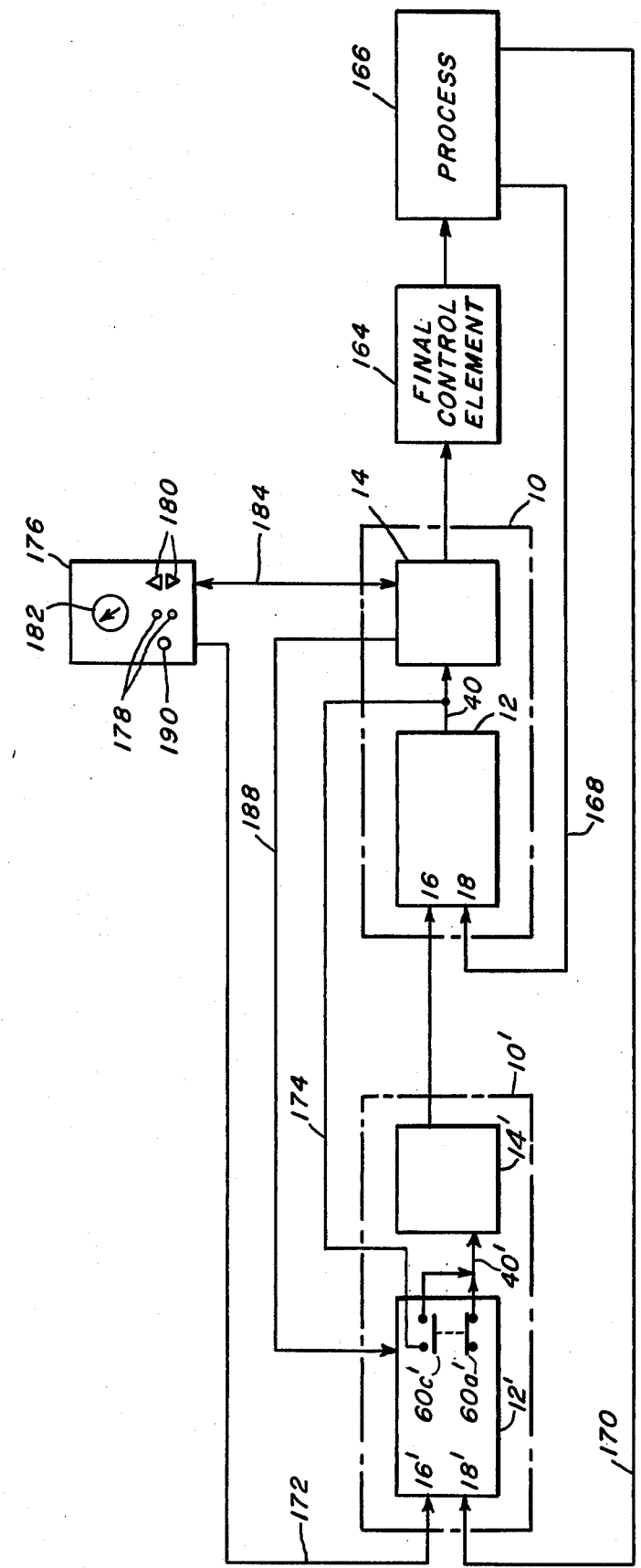
FIG. 5 is a schematic block diagram of a multiple loop process control system embodying the invention.

FIG. 5 illustrates cascade control of a process by a two loop control system. The second stage 14 of the inner loop controller 10 applies the position control signal to a final control element 164 which in turn regulates the process 166. The first stage 12 of the inner controller 10 supplies the speed signal to the integrator in the second stage 14 when the inner loop is operating in the automatic mode. The speed signal is derived by the first stage of the controller from a first measured variable signal applied to the inner loop measured variable input terminals 18 through lead 168 and from the output signal generated by the second stage 14' of the outer loop controller 10' applied to the first controller set point inputs 16. When the second stage 14' of the outer loop controller 10' is operating in the regulator mode, it integrates the signal applied to it by the first stage 12' of the outer loop controller over the lead 40'. With the normally closed contacts 60a' of the outer loop control/track relay 60 closed, the first stage 12' of the outer loop controller applies a speed signal to the lead 40' which is derived as a function of a second measured process variable applied to the measured variable input 18' over lead 170 and a set point signal applied through lead 172 to the set point input 16'. On the other hand, when the outer loop control/tract relay is energized, the speed signal generated by the first stage of the inner loop controller 12 is applied to the second stage 14' of the outer loop controller through lead 174 and the normally open contacts 60c'. In order the outer loop integrator to track the inner loop measured variable signal, the reversing switch 62' in the first stage of the outer loop controller must be operated to the reversing position.

The inner and outer loop controllers are controlled from a common remote station 176 located in the control room. The remote station includes controls such as push buttons 178 for transferring the second stage 14 of the inner loop controller between the director and regulator modes, push buttons 180 for generating the RAISE and LOWER signals for the inner loop integrator while in the director mode and a meter 182 for displaying the control signal applied to the final control element. These signals are transferred between the remote station and the second stage of the inner loop controller through leads represented generally by the lead 184. When the operator transfers the inner loop to the director mode by generating a DIRECTOR signal with one of the push buttons 178, the control/track relay 60' in the first stage of the outer loop is energized by the director/regulator flip-flop in the second stage 14 of the inner loop through lead 188. A control 190 in the remote station permits the operator to adjust the set point signal applied to the outer loop controller through the lead 172.

By way of example, the two-loop control system of FIG. 5 may be used to control a process fluid level. In such an application, the final control element 164 is a valve which controls the flow of fluid into the process. The outer loop measured variable signal which appears on lead 170 is the fluid level. The operator sets the desired level through the control 190 on the remote station. The inner loop measured variable which appears on lead 168 is the fluid flow rate. In automatic operation, the outer loop controller 10' generates a flow control signal which is a function of the desired level signal on lead 172 and the actual level signal on lead 170. This flow control signal is applied to the set point input 16 of the inner loop controller 10 which generates a valve position signal as a function of the desired flow rate signal and the actual flow rate signal appearing on lead 168. This valve position signal then operates the valve 164 to adjust the flow rate to the commanded rate. When the actual level reaches the desired level, the flow control signal will go to zero and the valve will be shut off.

The operator may transfer the system to the manual mode by operating the DIRECTOR push button 178 which transfers the inner loop second stage 14 to the director mode. The valve position signal will remain equal to that being generated at the time of transfer. Upon the transfer of the inner loop to manual control, the control/track relay in the outer loop controller first stage 12' is energized to open the contacts 60a' and close the contacts 60c'. The operator then may manually adjust the position of the valve by operating the RAISE or LOWER switches 180. As the flow rate signal appearing on lead 168 varies in accordance with the manual valve positioning, the valve speed signal appearing on lead 40, which is no longer effective to control the second stage 14 of the inner loop controller, is applied to the integrator 14' of the outer loop controller through the new closed contacts 60c'. This inner loop speed signal is then integrated by the second stage of the outer loop controller which is still operating in the regulator mode and is applied to the set point input 16 of the inner loop controller. The integrator in the outer loop second stage 14' will therefore track the inner loop flow rate signal on lead 168, and the inner loop signal on lead 40 will be driven towards zero. Thus, when the operator transfers the inner loop back to automatic control by transferring the inner loop second stage 14 to the regulator mode through REGULATOR push button 178, the initial input to the inner loop integrator will be zero and there will be no immediate change in the valve position. While the system is in the manual mode, the first stage of the outer loop controller generates an error signal; however, since there is no integrator in the first stage of the controllers, no large error signal is accumulated. Therefore, when the outer loop transfers to automatic through the opening of the contacts 60c' and the closing of the contacts 60a' as the inner loop director/regulator flip-flop is transferred to the regulator mode, no large error signal is applied to the second stage 14' of the outer controller through lead 40'. In any event, since the second stage of the outer loop controller contains an integrator, the flow control signal will slowly ramp to the new value called for by the fluid level set point. This slow change in the flow control signal will then institute a smooth change in the valve position signal through the integrator in the second stage of the inner loop controller. Thus, it can be seen that a smooth transition between the automatic and manual modes in a two-loop system is achieved with only a lead connecting the output of the first stage of the inner loop controller to the input of the second stage of the outer loop controller and a signal to switch between this signal and the output of the first stage of the outer loop controller. From the above discussion, it can be appreciated that additional loops can be operated in a similar manner by maintaining the integrator in the second stage of each successive loop under control with the speed signal generated by the first stage of the preceding controller.

From the above discussion, the reason for designating the two modes of operation of the second stage of the controllers as director and regulator is evident. When the controller is in the director mode, its output is manually controlled. However, when it is in the regulator mode, it is not necessarily true that the associated control loop is being operated in the automatic mode. For instance, when the system is in manual operation, the second stage of the outer loop controller is being operated in the regulator mode and it responds to signals generated automatically by the first stage of the inner loop controller. Hence, the terms "automatic" and "manual" are used to designate the operating mode of the control loop, but the terms "director" and "regulator" are used to designate the mode of operation of the second stage of the controller.

What is claimed is:

1. A process control system including:
   measurement means for generating a feedback signal representative of a selected process variable,
   set point means for generating a signal representative of a desired value of the measured variable,
   controller means for generating a control signal from the feedback signal and the set point signal, said controller being operative to apply selected control action including at least one form of control action other than integral action to the feedback signal and only integral action to set point signal, and
   a final control element responsive to the control signal to modify the process so as to drive the measured variable toward the set point value.

2. The apparatus of claim 1 wherein the controller includes means for applying integral and proportional control actions to said feedback signal.

3. The apparatus of claim 2 including means for applying derivative action to said feedback signal.

4. The apparatus of claim 1 wherein the controller includes means for generating an error signal as the difference between the set point signal and the feedback signal, means for applying derivative action to the feedback signal, means for summing the derivative of the feedback signal with the error signal, and a single means for applying integral action to the resultant signal.

5. The apparatus of claim 4 including means for applying derivative action to the derivative of the feedback signal to generate the second derivative of the feedback signal, and wherein the means for summing the derivative of the feedback signal with the error signal includes means for including the second derivative of the feedback signal in the sum.

6. A method of controlling a process including the steps of:
   generating a feedback signal proportional to a selected process variable,
   generating a set point signal representative of a desired value of the measured variable,
   applying selected control action including at least one form of control action other than integral action to the feedback signal,
   applying only integral action to the set point signal, and
   modifying the process as a function of the resultant feedback signal and set point signal.

7. The method of claim 6 wherein the step of applying selected control action to the feedback signal includes the step of applying proportional action to the feedback signal by first applying derivative action to the feedback signal and then integrating the resultant derivative feedback signal.

8. The method of claim 7 including the step of applying integral action to the feedback signal by the steps of summing the feedback signal in opposition to the set point signal to generate an error signal, summing the error signal with the derivative feedback signal to generate a desired rate signal and then integrating the desired rate signal.

9. The method of claim 7 including the additional step of applying derivative action to the derivative feedback signal prior to the step of integrating the resultant signal whereby the resultant control action applied to the feedback signal is derivative action.

10. A cascaded two loop process control system comprising:
    a final control element operative to a position called for by a final control element position signal for modifying the process in accordance therewith,
    an inner loop controller including a first integrator operative to generate said final control element position signal through integration of a final control element speed signal, means for generating a director mode final control element speed signal as a function of a manual signal and means for generating a regulator mode final control element speed signal as a function of an inner loop set point signal and a first measured variable signal representative of a first selected process variable,
    an outer loop controller comprising a second integrator operative to generate said inner loop set point signal as a function of an inner loop set point rate signal, means for generating an inner loop set point rate tracking signal as a function of the regulator mode final control element speed signal and means for generating an inner loop set point rate control signal as a function of an outer loop set point signal and a second measured variable signal representative of a second selected process variable, and
    transfer means operative between a director mode wherein the director mode final control element speed signal is applied to the first integrator and the inner loop set point rate tracking signal is applied to the second integrator for manual process control, and a regulator mode wherein the regulator mode final control element speed signal is applied to the first integrator and the inner loop set point rate control signal is applied to the second integrator for automatic process control.

11. The apparatus of claim 10 wherein the means for generating the regulator mode final control element speed signal and the means for generating the inner loop set point rate control signal include means for applying selected control actions, not including integral action, to the signals applied thereto.

12. The apparatus of claim 10 wherein the means for generating the inner loop set point rate tracking signal includes means for generating said signal with a polarity opposite to that of the regulator mode final control element speed signal.

13. Apparatus for generating a final control element position signal for positioning the final control element in a process control system, said apparatus comprising:
a signal generator including a switch, means operative to generate an output signal having a predetermined magnitude when said switch is closed and which increases in magnitude as a function of the time that the switch remains closed and means for resetting the output signal to said predetermined magnitude upon opening of said switch, and
an integrator connected to the signal generator and operative to generate the final control element position signal as a function of said output signal.

14. A method of controlling a two loop process control system by positioning a final control element, including the steps of:
generating the final control element position signal by integrating a final control element speed signal,
generating a director mode final control element speed signal manually,
generating a regulator mode final control element speed signal as a function of an inner loop set point signal and a first measured variable signal representative of the value of a first selected process variable,
generating the inner loop set point signal by integrating an inner loop set point rate signal,
generating an inner loop set point rate tracking signal from the regulator mode final control element speed signal,
generating an inner loop set point rate control signal as a function of an outer loop set point signal and a second measured variable signal representative of the value of a second process variable,
selecting the director mode final control element speed signal to generate the final control element position signal and the inner loop set point rate tracking signal to generate the inner loop set point signal for manual control of the process, and
selecting the regulator mode final control element speed signal to generate the final control element position signal and the inner loop set point rate control signal to generate the inner loop set point signal for automatic control of the process.

15. The method of claim 14 wherein the step of generating the inner loop set point tracking signal comprises the step of reversing the polarity of the regulator mode final control element speed signal.

16. The method of claim 14 wherein selected control action not including integral action is used to generate the regulator mode final control element speed signal and the inner loop set point rate control signal.

* * * * *